April 22, 1924. 1,491,373
J. ANDERSON
THAWING POINT
Filed Nov. 14, 1922
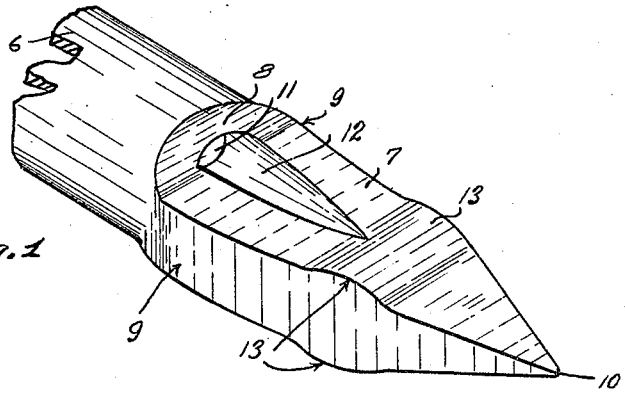
Fig. 1
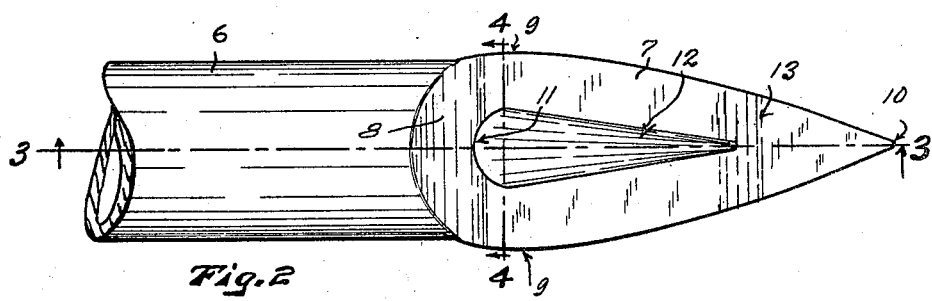
Fig. 2
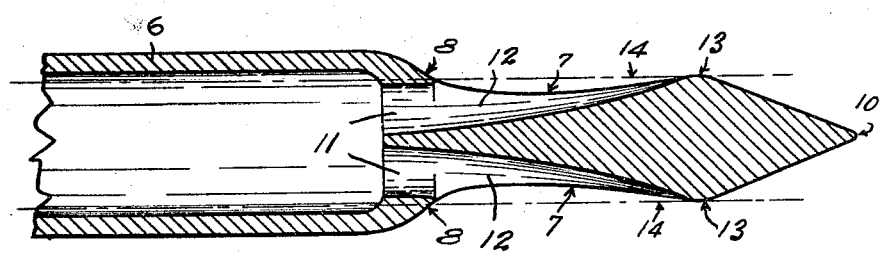
Fig. 3
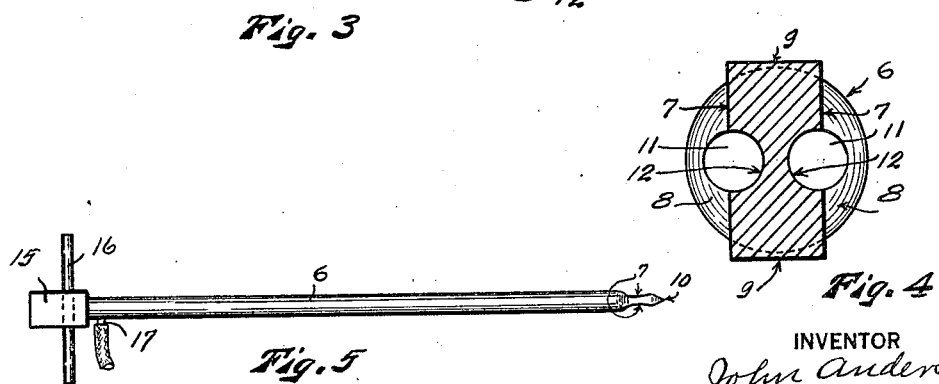
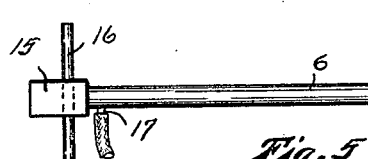
Fig. 5
Fig. 4
INVENTOR
John Anderson
BY
Frank Wawe
ATTORNEY Patented Apr. 22, 1924.

1,491,373

UNITED STATES PATENT OFFICE.

JOHN ANDERSON, OF SEATTLE, WASHINGTON.

THAWING POINT.

Application filed November 14, 1922. Serial No. 600,880.

*To all whom it may concern:*

Be it known that I, JOHN ANDERSON, a subject of the King of Sweden, residing at Seattle, in the county of King and State of Washington, have invented a certain new and useful Improvement in Thawing Points, of which the following is a specification.

My invention relates to improvements in thawing points that are adapted to be driven or otherwise forced into frozen ground and to have a thawing agent such as cold or hot water or steam emitted therefrom through perforations or apertures in the tip portions of said thawing points for the purpose of thawing the frozen ground and the object of my invention is to provide a thawing point having a tip provided with outlet perforations or apertures that are arranged to direct water or steam forwardly in substantial alignment with the tip but which perforations are shielded by protruding parts of the tip in such a manner that they will not be easily clogged by the gravel or dirt into which the point is being driven.

Another object is to provide a thawing point having a tip that will make a hole slightly larger in diameter than the shank with which the tip is connected thereby insuring that the shank will always work freely within the hole.

Other and more specific objects will be apparent from the foregoing description taken in connection with the following drawings, wherein—

Figure 1 is a view in perspective of a thawing point constructed in accordance with my invention a fragment only of the shank that is connected with the thawing point proper or tip being shown;

Fig. 2 is a plan view showing one of the wider sides of the thawing point tip;

Fig. 3 is a view in longitudinal section on broken line 3, 3 of Fig. 2;

Fig. 4 is a view in cross-section on broken line 4, 4 of Fig. 2; and

Fig. 5 is a view in side elevation on a reduced scale showing the entire thawing point including the shank and the tip.

Referring to the drawings, throughout which like reference numerals designate like parts, a tubular shank 6 that terminates in a thawing point proper which I have designated as a tip and which is flattened, as shown, to form two substantially parallel sides 7 the distance between which is considerably less than the external diameter of the shank 6, an inclined or sloping surface 8 being formed at the junction of the flattened sides 7 with the shank 6.

The thickness of the thawing point tip in a plane at right angles to the flattened sides 7 and adjacent the junction of such tip with the shank 6 is slightly greater than the external diameter of the shank 6 thereby forming bulging portions as indicated at 9 in Fig. 2, from which bulging portions the tip thence tapers to a substantially sharp point 10.

Perforations 11 are formed in the sloping surfaces 8 at the junction of the thawing point tip and the shank 5, said perforations registering with grooves 12 in the flattened sides 7 of the tip and affording means through which thawing agent, as hot or cold water or steam may discharge from the interior of the shank 5 around the tip.

The flattened sides 7 are bulged as at 13, a short distance from the forward end of the tip and thence taper, as shown from the bulged portions 13 to the pointed forward end 10.

The grooves 12 are deepest at the location of the perforations 11 and thence taper gradually, as shown in Fig. 3, and end at or just to the rear of the bulged portions 13.

The bulged portions 13 protrude outwardly beyond those planes which are parallel with the axis of the thawing point and with the sides 7 and which pass through the outermost edges of the perforations 11, as indicated by the broken lines 14, so that when the thawing point is driven or otherwise forced into the ground a large enough hole will be opened up so that dirt or gravel will not be forced into the perforations. After the solid material into which the tip is being driven has been forced to one side by the bulged portions 13 of said tip, any loose dirt or gravel that may drop into the grooves 12 will ordinarily be forced out by the pressure of the water or steam and will not clog the perforations.

The thawing point shown in the accompanying drawings is the type I used in what is known as the process of cold water thawing and is provided with relatively large perforations 11 through which cold water may be forced outwardly. If steam is to be used as the thawing agent the perforations 11 will be made smaller.

The shank 6 ordinarily terminates at its outer end in a relatively large and massive block 15 of solid metal having a rigid cross arm 16 extending therethrough which serves as a handle, as shown in Fig. 5, an inlet tube 17, through which a thawing agent as water or steam under pressure may be introduced, is connected with the shank 6 adjacent the block 15.

In use the operator grasps the handle 16 and by reciprocation and rotation of the shank forces the thawing point into the frozen ground to the desired depth, the thawing agent as water or steam under pressure being admitted constantly as the point is being driven. If in the process of driving, the tip encounters a large rock or similar obstruction that will not yield to the combined reciprocation and rotary motion of the thawing point, blows may be struck with a heavy sledge or maul on the block 15 to drive the tip through or cause it to displace the obstruction.

The bulging or protruding portions 9 of the tip insure that a hole larger in diameter than the shank 5 will be opened up by the tip on account of the rotary movement of such tip and thus tend to prevent the device from wedging or binding in the hole.

After the device is driven to the desired depth in the frozen ground it is allowed to remain for a considerable period of time, during which time the thawing agent which is constantly supplied under pressure will thaw a relatively large body of earth around the thawing point.

The location of the perforations 11 just inside of the planes that are tangent to the proceeding portions 13 of the tip is an important feature of the invention due to the fact that it prevents said perforations from becoming clogged with gravel when the point is driven.

The foregoing description taken in connection with the accompanying drawings clearly discloses the plan of construction and method of operation of my invention, but, while I have shown and described what I now consider to be a preferred embodiment of my invention it will be understood that the disclosure is merely illustrative and that such changes may be resorted to as are within the scope and spirit of my invention.

What I claim is:

1. A thawing point embodying a tubular shank, and a tip on the forward end of said shank which shank has forwardly directed fluid outlet perforations at the base of said tip and said tip having bulging portions that project sidewise beyond the plane of the outermost extremities of said perforations.

2. A thawing point embodying a tubular shank, and a flattened tip on said shank, the thickness of said tip in one direction being less than the diameter of said shank, said shank having forwardly directed perforations extending from the interior to the exterior thereof at the location of the junction of said shank and tip said tip having bulging portions that project sidewise beyond the planes of the outermost edges of said perforations.

3. A thawing point embodying a tubular shank, and a flattened tip on the forward end of said shank, said shank having forwardly directed fluid outlet perforations at the location of its junction with said tip, the flattened sides of said tip having tapered grooves that register with said perforations, said grooves terminating short of the end of said tip, and bulging portions on said tip in front of the forward end of said grooves and projecting sidewise beyond the planes of the outermost extremities of said perforations.

4. A thawing point embodying a tubular shank, a flattened tip on said shank, the maximum thickness of said tip in one axial plane of said shank being greater than the diameter of said shank and the thickness of said tip in a plane at right angles to said above named plane being less than the diameter of said shank and means for discharging a thawing agent from said shank along the sides of said tip.

In witness whereof, I hereunto subscribe my name this 8th day of November, A. D 1922.

JOHN ANDERSON.